(12) United States Patent
Volfson

(10) Patent No.: US 11,675,172 B2
(45) Date of Patent: Jun. 13, 2023

(54) AFOCAL ATTACHMENT FOR A TELESCOPE

(71) Applicant: Torrey Pines Logic, Inc., San Diego, CA (US)

(72) Inventor: Leo Volfson, San Diego, CA (US)

(73) Assignee: Torrey Pines Logic, Inc., San Diego, CA (US)

( * ) Notice: Subject to any disclaimer, the term of this patent is extended or adjusted under 35 U.S.C. 154(b) by 0 days.

(21) Appl. No.: 17/679,370

(22) Filed: Feb. 24, 2022

(65) Prior Publication Data

US 2022/0342190 A1    Oct. 27, 2022

Related U.S. Application Data

(63) Continuation of application No. 16/928,196, filed on Jul. 14, 2020, now Pat. No. 11,294,154.

(Continued)

(51) Int. Cl.
*G02B 15/12* (2006.01)
*G02B 7/02* (2021.01)
(Continued)

(52) U.S. Cl.
CPC ............. *G02B 15/12* (2013.01); *G02B 7/004* (2013.01); *G02B 7/021* (2013.01); *G02B 7/023* (2013.01);
(Continued)

(58) Field of Classification Search
CPC ........ G02B 15/12; G02B 7/004; G02B 7/021; G02B 7/023; G02B 15/143;
(Continued)

(56) References Cited

U.S. PATENT DOCUMENTS

| 4,681,406 A | 7/1987 | Naito et al. |
| 4,988,173 A | 1/1991 | Margolis |

(Continued)

FOREIGN PATENT DOCUMENTS

| GB | 2327508 | 1/1999 |
| JP | 3097550 | 1/2004 |
| WO | WO2021/011553 | 1/2021 |

OTHER PUBLICATIONS

International Search Report and Written Opinion, International Application No. PCT/US2020/041962, dated Oct. 16, 2020, 13 pages.

(Continued)

*Primary Examiner* — James C. Jones
(74) *Attorney, Agent, or Firm* — Fish & Richardson P.C.

(57) ABSTRACT

This disclosure describes an afocal attachment that allows for alteration of received electromagnetic radiation (or "light") prior to entry into the telescope. For example, a rifle scope may have a base magnification of 2×, and the afocal attachment may allow magnification of a received image at levels ranging from 2× to 4×. In this example, the entire telescope system with the afocal attachment installed will have an overall magnification of 4× to 8×. In another example, the magnification of the telescope can be increased, transforming a telescope with a 4× magnification into a telescope with a higher effective magnification. In some instances the afocal attachment's optical axis can be configured to permit independent adjustment, allowing for easy removal and reinstallation of the afocal attachment without a need to re-adjust the telescope itself.

18 Claims, 5 Drawing Sheets

Related U.S. Application Data

(60) Provisional application No. 62/874,490, filed on Jul. 15, 2019.

(51) Int. Cl.
   *G02B 15/14* (2006.01)
   *G02B 27/01* (2006.01)
   *G02B 7/00* (2021.01)

(52) U.S. Cl.
   CPC ....... *G02B 15/143* (2019.08); *G02B 27/0101* (2013.01); *G02B 2027/014* (2013.01)

(58) Field of Classification Search
   CPC .......... G02B 27/0101; G02B 2027/014; G02B 23/14; G02B 23/145; F41G 1/38
   See application file for complete search history.

(56) References Cited

U.S. PATENT DOCUMENTS

| | | |
|---|---|---|
| 5,499,456 A | 3/1996 | Tomita |
| 7,612,958 B2 | 11/2009 | Jibiki |
| 7,944,611 B1 | 5/2011 | Regan et al. |
| 11,294,154 B2 | 4/2022 | Volfson |
| 2010/0085993 A1 | 8/2010 | Bietry et al. |
| 2014/0009842 A1 | 1/2014 | Frazier |
| 2017/0131517 A1 | 5/2017 | Nagler |
| 2017/0255085 A1* | 9/2017 | Volfson ................ G03B 17/566 |
| 2018/0210173 A1 | 7/2018 | Blahnik et al. |
| 2021/0018733 A1 | 1/2021 | Volfson |

OTHER PUBLICATIONS

Extended European Search Report in European Appln No. 20840694.2, dated Sep. 7, 2022, 5 pages.

* cited by examiner

AFOCAL ATTACHMENT FOR A TELESCOPE

CROSS-REFERENCE TO RELATED APPLICATIONS

This application is a continuation application of and claims priority under 35 U.S.C. § 120 to U.S. application Ser. No. 16/928,196, filed on Jul. 14, 2020, which claims priority under 35 U.S.C § 119 to U.S. Application Ser. No. 62/874,490, filed on Jul. 15, 2019, the entire contents of each of which are incorporated by reference herein.

TECHNICAL FIELD

This disclosure pertains to an afocal attachment for a telescope.

BACKGROUND

Afocal adapters are optical devices usually made of two or more lenses that receive and expand or contract waves of electromagnetic radiation entering a lens that follows the afocal adaptor. An afocal adaptor does not have a focal point but resizes received images. Another name for afocal adapters is "beam expanders." A beam expander can expand or contract the incoming beam.

SUMMARY

The disclosure relates to an afocal attachment for a telescope. A telescope as disclosed herein can be considered to be optical or digital and refer to, for example, a weapon scope, binocular set, camera lens, or other optical device. The details of one or more implementations of the subject matter of this specification are set forth in the following description and the accompanying drawings to enable a person of ordinary skill in the art to practice the disclosed subject matter. Other features, aspects, and advantages of the subject matter will become apparent from the description, the drawings, and the claims.

In an implementation, an afocal attachment, includes an optical channel including a receiving end and a transmitting end which defines a first optical axis. The afocal attachment further includes a first lens positioned at the receiving end of the optical channel and a second lens positioned at the transmitting end of the optical channel, an inner housing which includes an inner surface that defines a receptacle for the second lens. The inner housing can enclose a portion of the optical channel. The afocal attachment also includes an outer housing which encloses at least a portion of the inner housing, and is movably attached to the inner housing, to permit adjustment of the optical axis relative to the afocal attachment. A mounting connection is provided for mounting the afocal attachment in a position in front of an objective lens of an optical instrument (e.g., a telescope, or rifle scope) where the optical instrument defines a second optical axis. The mounting position can be such that the first optical axis and the second optical axis can be aligned. The afocal attachment further includes at least one adjustment mechanism in contact with the inner housing, which permits precision adjustment of the alignment of the first optical axis.

Implementations can optionally include one or more of the following features.

In some instances, the mounting connection is a friction mount which includes a retention band and a tightening screw. The mounting connection can be affixed to either the inner or the outer housing.

In some instances, the mounting connection is a thread and screw type connection, and the afocal attachment is threaded directly onto the optical instrument. The mounting connection can be affixed to either the inner or the outer housing.

In some instances, the mounting connection is a bayonet mount.

In some instances, the mounting connection includes a mounting block attached to the outer housing and configured to be mounted to a Picatinny rail that is shared by the optical instrument. Additionally the mounting block can permit a height above the rail of the afocal attachment to be adjusted.

In some instances, the magnification produced by the afocal attachment is adjustable. The magnification can be adjusted by translating a third lens, supported by an intermediate housing, which is positioned between the first lens and the second lens, and translatable along the optical axis.

In some instances, the afocal attachment includes a primary reflector and a secondary reflector, and radiation entering the afocal attachment reflects from the primary reflector to the secondary reflector.

In some instances, the afocal attachment includes a digital optics package located in a central dead zone of the first lens and including: at least one aperture for receiving electromagnetic radiation, a processing device to transform electromagnetic radiation into data, and a digital optics projector configured to project an overlay image generated based on the data through the second lens in addition to the image provided by the optical channel. The digital optics package can include a night vision optical system, an infrared optical system, a laser rangefinder, or any combination thereof.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes an afocal adaptor attachment ("afocal attachment") for a telescope, particularly to an objective end of the telescope. In the present disclosure, a "telescope" can be considered to be optical or digital and refer to, for example, a weapon scope, binocular set, camera lens, or other optical device. An afocal system is formed by the combination of two optical focal systems and can have a fixed or variable denomination.

The described afocal attachment allows for alteration (for example, magnification) of received electromagnetic radiation (or "light") prior to entry into the telescope. For example, a rifle scope may have a base magnification of 2× and the afocal attachment may allow magnification of a received image at levels ranging from 2× to 4×. In this example, the entire telescope system with the afocal attachment installed will have an overall magnification of 4× to 8×. In another example, the magnification of the telescope can be increased, transforming a telescope with a 4× magnification into a telescope with a higher effective magnification (such as, 8× or 16×). In some instances, the afocal attachment's optical axis can be configured to permit independent adjustment, allowing for easy removal and reinstallation of the afocal attachment without a need to re-adjust the telescope itself.

A benefit of the design presented herein is that the described afocal attachment can permit quick and inexpensive changes to optical characteristics of a telescope. In some implementations, the afocal attachment can permit changing one or more characteristics of the telescope (for example, field-of-view or magnification) or otherwise influencing received electromagnetic radiation (such as, optical, ultraviolet, and infrared wavelengths of light). In some implementations, the afocal attachment can provide additional details or information to the user that would not otherwise be possible with a conventional telescope. For example, in addition to increasing a telescope's magnification, the afocal attachment can additionally include a laser range finder or infrared (IR) imaging device which provides an IR overlay image to the objective lens of the telescope.

Figure 1:
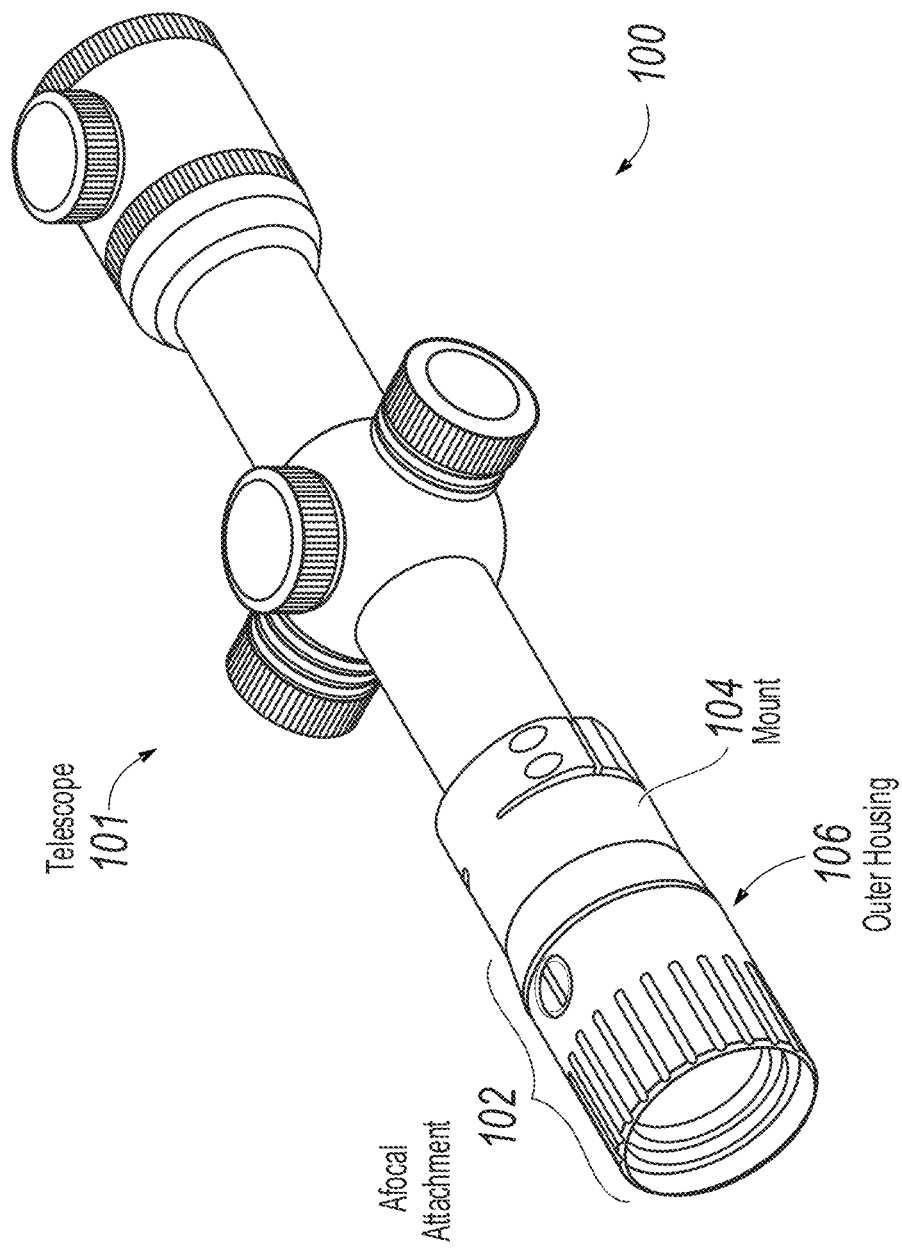
FIG. 1 is an isometric view 100 of a telescope configured with an afocal attachment, according to an implementation of the disclosure.

FIG. 1 is an isometric view of a telescope 100 configured with an example afocal attachment 102, according to an implementation of the disclosure. In FIG. 1, the telescope 101 is a rifle scope. Although all possible implementations are not illustrated, as will be appreciated by those of ordinary skill in the art, attachment of the afocal attachment 102 to the telescope 101 can be accomplished in different ways. In some implementations, the afocal attachment 102 can be coupled to the telescope 101 with a semi-permanent mount 104. In some instances, the mount 104 can use a clamping mechanism, threads, magnets, thumbscrews, elastic bands, adhesive, or any other method consistent with this disclosure for attaching the afocal attachment 102 to the objective end of the telescope 101. In some instances, the afocal attachment 102 can be threaded into mount 104. In some instances, a user can easily attach or remove the afocal attachment 102 from the end of the telescope 101. In some instances, a quick release mechanism can be used between the afocal attachment 102 and the mount 104, permitting a secure connection and easy removal of the afocal attachment 102 from the mount 104 by, for example, a simple 45-degree or 90-degree turn of the afocal attachment 102 in relation to the mount 104. In some implementations, the afocal attachment 102 is not directly mounted to the telescope 101, but instead both telescope 101 and afocal attachment 102 are coaxially mounted on a guide rail. For example, if the telescope 101 is a rifle scope and is mounted to a Picatinny rail on a firearm, the mount 104 can be configured to rigidly attach the afocal attachment 102 to the Picatinny rail in front of the telescope 101. In these implementations, because the afocal attachment 102 is afocal in nature, positioning at a precise distance from the objective lens of the telescope 101 is not required. These implementations may further include a gasket or cover, which can block light and/or dust from entering the system between the afocal attachment 102 and the telescope 101.

In some implementations, the mount 104 can be configured to be shockproof and designed to withstand recoil of a firearm without disrupting an alignment between the afocal attachment 102 and the telescope 101. In some instances, the mount 104 can be configured as integral with an outer housing 106 or an inner housing (not illustrated—refer to FIG. 3) of the afocal attachment 102, and the entire system can be threaded or attached to the telescope 101 (for example, using a bayonet lug or other mounting point as will be understood by those of ordinary skill in the art). Accordingly, the present disclosure is not limited by the provided examples. For example, a different mounting structure used could be a locking-type surface (not illustrated) that is inserted into a corresponding mating-type surface (configured as part of the telescope 101) and slid/twisted into place to lock the afocal attachment 102 against the telescope 101.

In another example, the mount 104 can be made of a magnetically-attractive material (for example, iron, steel, or other ferromagnetic/paramagnetic materials) and the outer housing 106 of the afocal attachment 102 can be configured with a magnet to secure the afocal attachment 102 to the scope 101 (or vice versa). In some configurations, the afocal attachment 102 can be configured to use threads, clips, screws or other attachment methods for coupling with the telescope 101. For example, the objective end of the telescope 101 can be threaded to engage with threads or other structures configured into the outer housing 106 or inner housing (not illustrated—refer to FIG. 3) of the afocal attachment 102.

In some implementations, the afocal attachment 102 can be sealed (for example, hermetically), to prevent external contamination of the optical channel. In these implementations the optical chamber can be filled, for example, with nitrogen or argon to prevent intrusion of gasses, water vapor, or other undesirable substances (such as, dust or dirt) that could degrade optical performance of the afocal attachment 102.

Figure 2:
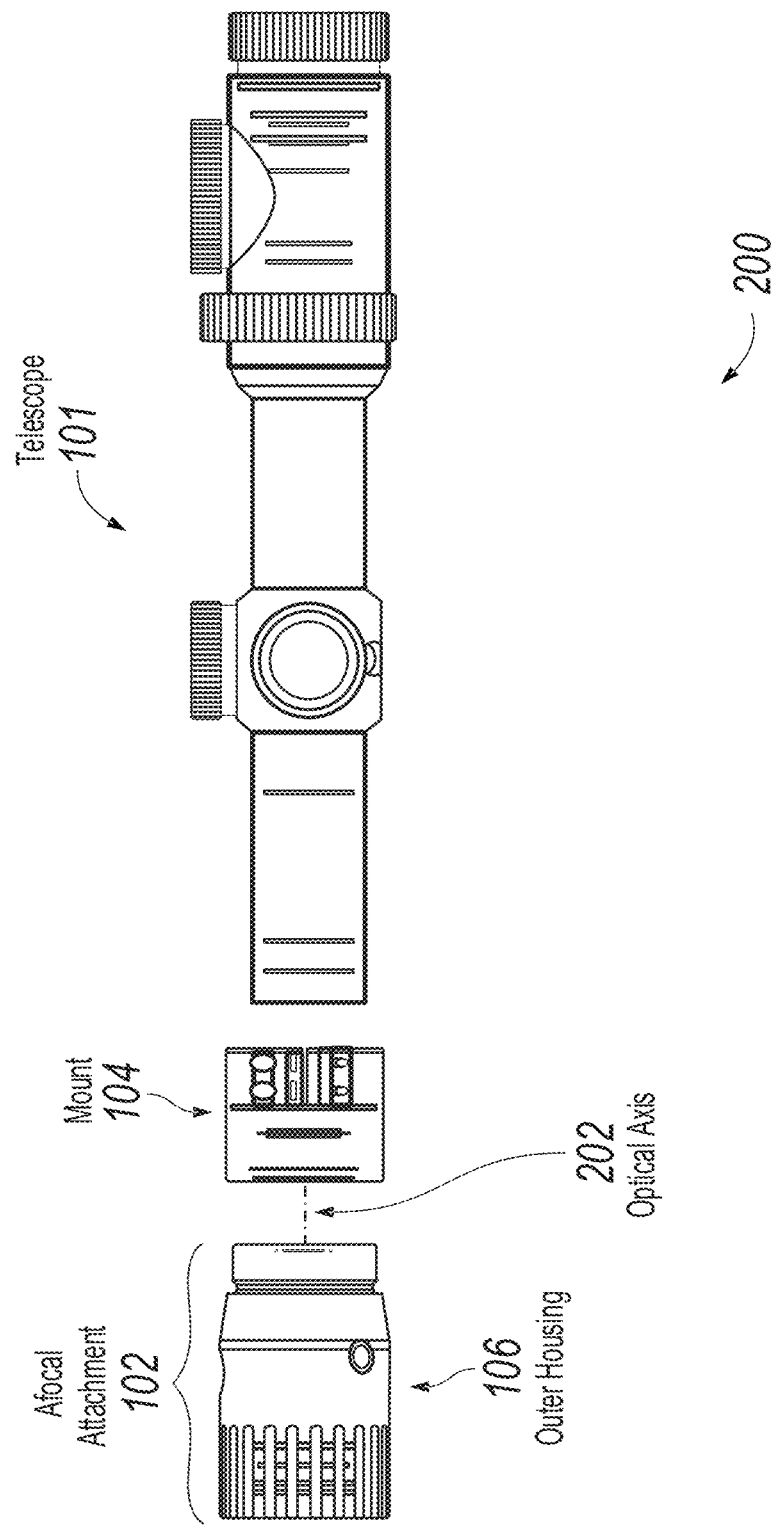
FIG. 2 is a partially exploded side view 200 of the telescope configured with the example afocal attachment as illustrated in FIG. 1, according to an implementation of the disclosure.

FIG. 2 is a partially exploded side view 200 of the telescope 101 configured with the example afocal attachment 102 as illustrated in FIG. 1, according to an implementation of the disclosure. In some implementations of FIG. 2, the mount 104 is of a clamp-type design, which is affixed using friction to the front portion of the telescope 101. The optical axis 202 is depicted as a dotted line and represents the primary optical axis of the afocal attachment 102. In some implementations, the afocal attachment 102 provides a mechanism (for example, turret screws, a worm drive, or springs, among other mechanisms consistent with this disclosure) for making adjustments to the alignment of the optical axis 202, such that it can be nominally aligned with an optical axis of the telescope 101.

Figure 3:
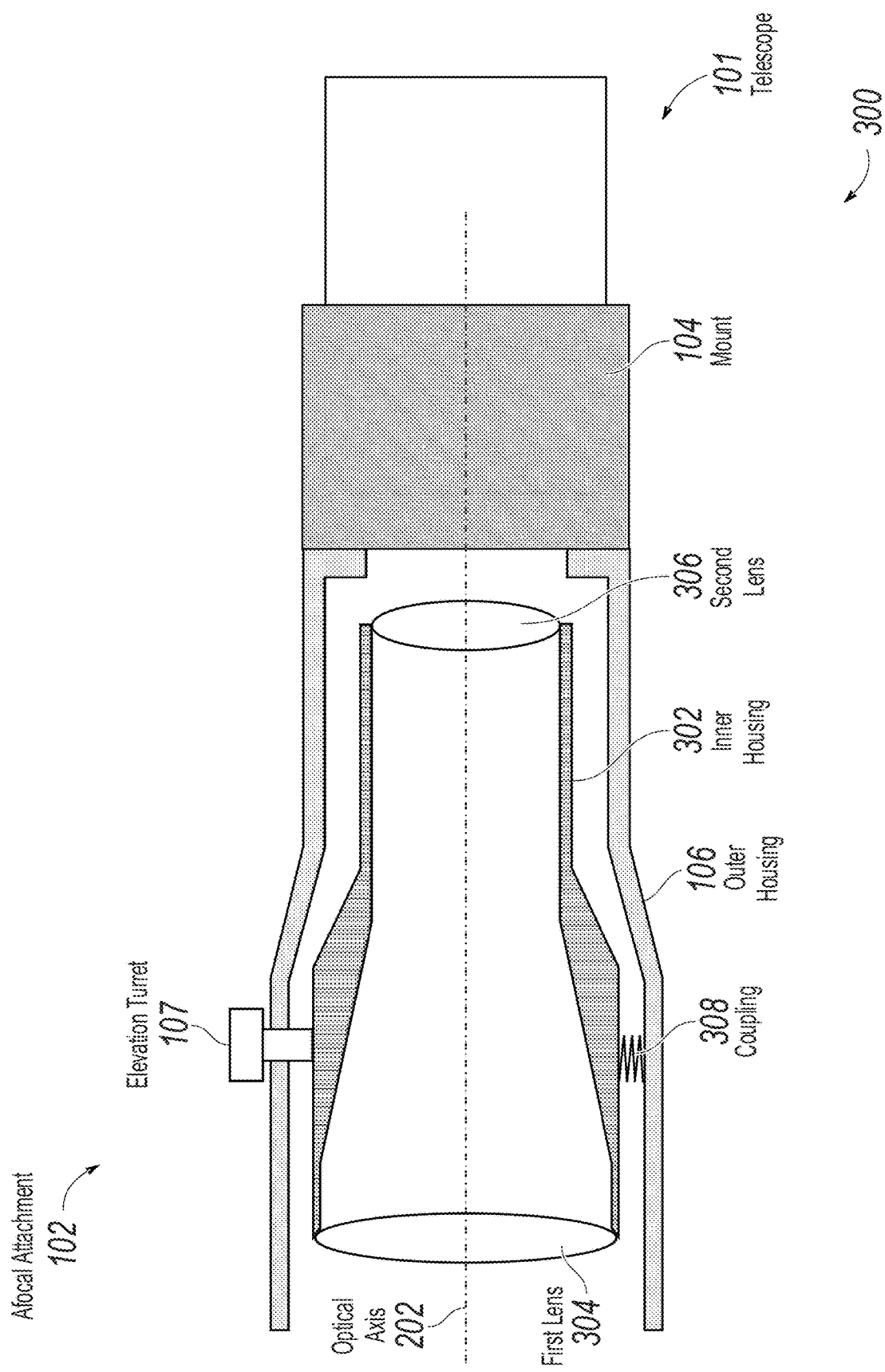
FIG. 3 is a cutaway diagram 300 of an example afocal attachment in a two-lens configuration, according to an implementation of the disclosure.

FIG. 3 is a cutaway diagram 300 of an example afocal attachment 102 in a two-lens configuration, according to an implementation of the disclosure. While the depicted implementation includes two lenses, more than two lenses is possible (for example, refer to FIG. 4). Additionally, while a first lens 304 and a second lens 306 are each shown as single lenses, in some implementations, they're both lens systems, which include multiple staged lenses for each lens system.

As illustrated in FIG. 3, the first lens 304 can be positioned to redirect incident electromagnetic radiation to the second lens 306. In some implementations, the second lens 306 transmits the received electromagnetic radiation from the first lens 304 to the objective lens (not illustrated) of the telescope 101. In some instances, the first lens 304 and second lens 306 can be arranged in such a manner to provide magnification functionality. In this configuration, the afocal attachment 102 can be configured to expand electromagnetic radiation and to provide a magnification that is greater than 1× (for example, 2× or 4×). Alternatively, the afocal attachment 102 can be used to contract a beam of electromagnetic radiation and provide magnification that is less than 1× (for example, 0.5×, or 0.7×).

In some implementations, the second lens 306 can be supported by an inner housing 302. The inner housing encloses at least part of an optical channel defined by the optical axis 202. In some implementations, and as depicted in FIG. 3, the first lens 304 can also be supported by the inner housing 302. In other implementations, the first lens can instead be affixed to the outer housing 106, or to an additional structure that is not shown. It should be noted that, in some implementations the first lens 304 and the second lens 306 can be a single lens or a grouping of a plurality of lenses (for example, two or more lenses affixed using adhesives or other means).

In some implementations, the inner housing 302 can be coupled with the outer housing 106 in such a manner to permit adjustment of an alignment of the inner housing 302. In an alternative implementation (not illustrated), the optical axis 202 and optical channel can be defined by an axis (for example, a longitudinal axis) of the outer housing. In this alternative implementation, the first lens 304 can be affixed to the outer housing 106 and the outer housing 106 can be configured to be movable, while the inner housing 302 and the second lens 306 are affixed to the mount 104. In this configuration, the second lens 306 is fixed and the first lens 304 is moveable.

In some implementations, the inner housing 302 and the outer housing 106 can be coupled together using a coupling 308 (such as, one or more coil springs, leaf springs, friction mounts, or other type of coupling consistent with this disclosure) that allows for movement between the inner housing 302 and the outer housing 106. In these implementations, the coupling 308 can be under compressive stress and ensure that the inner housing 302 remains in a fixed position unless manually adjusted using an adjustment mechanism. In some implementations, the coupling 308 can be, but is not limited to, coil springs, leaf springs, a ball-and-socket-type joint, a friction mount, or any other attachment method consistent with this disclosure method that permits the inner housing 302 and the outer housing 106 to move relative to each other. Movement can be, for example, translation about one or more axes or rotation about one or more pivot points. For example, in one implementation, the inner housing 302 fits into the outer housing 106 in a ball-and-socket-type joint, which allows rotation around a pivot point at the center of the ball. Adjustment turrets (e.g., elevation turret 107) can then push or pull a portion of the inner housing 302.

In some implementations, the adjustment mechanism can be one or more elevation turrets 107 provided to allow fine-tuning of the optical axis 202 (for example, the horizontal or vertical axis of the optical axis 202). Although an elevation turret 107 is depicted in FIG. 3, mechanisms other than an elevation-type turret assembly can also be used to perform the described fine-tuning of the optical axis 202. In the depicted implementation of FIG. 3, as the elevation turret 107 is raised or lowered (for example, by threads or similar mechanism), one or more portions of the inner housing 302 can be physically raised or lowered relative to the outer housing 106. This functionality allows for alignment of the optical axis 202 for optimal viewing or to ensure weapon accuracy.

In some implementations, a parallax mechanism can be provided (for example, a knob) (not illustrated) which can adjust a location of one or more lenses in the afocal attachment 102, in order to allow the user to compensate for parallax error between the location of the user's eye and the optical axis 202. The parallax mechanism can, for example, adjust the focal distance of a reticle inside the telescope 101, by adjusting the location of the first lens 304 to minimize the apparent movement of the reticle if the user's eye is off axis.

Figure 4:
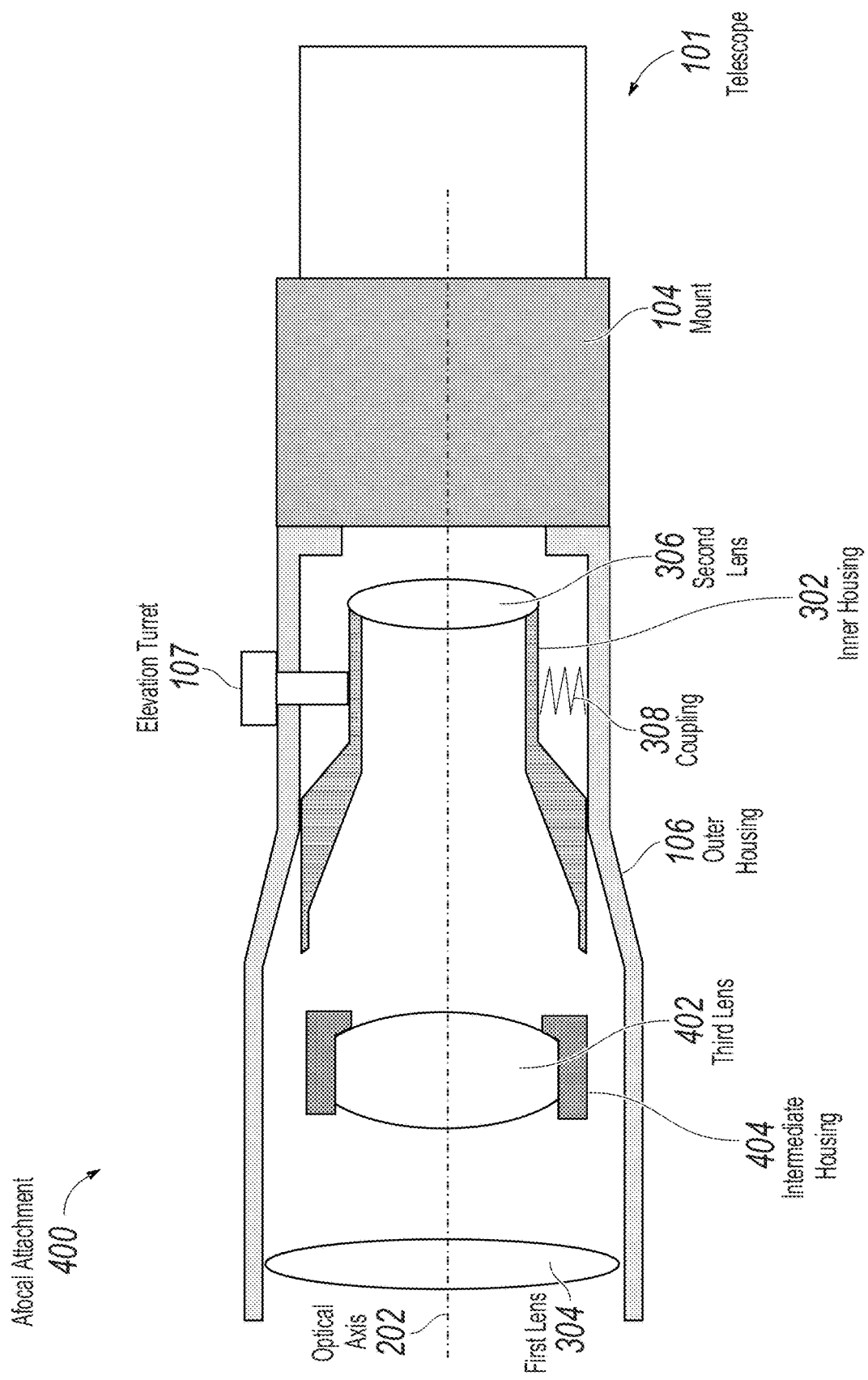
FIG. 4 is a cutaway diagram 400 of an example afocal attachment in a three-lens configuration, according to an implementation of the disclosure.

FIG. 4 is a cutaway diagram 400 of an example afocal attachment 102 in a three-lens configuration, according to an implementation of the disclosure. In FIG. 4, the optical axis 202 is aligned with the second lens 306 and the inner housing 302. Consistent with the previous discussion, in this implementation the first lens 304 is affixed to the outer housing 106, instead of the inner housing 302 as in FIG. 3. The illustrated configuration includes an additional third lens 402 positioned between the first lens 304 and the second lens 306.

In some implementations, the third lens 402 can be supported by an intermediate housing 404, which can be configured to be translatable along an optical axis. For example, a worm gear (not illustrated) can be used with a rotating ring (not illustrated), to allow an operator to adjust relative distances between the first lens 304/third lens 402, and the second lens 306/third lens 402. This configuration can permit an adjustable zoom feature or an afocal attachment 102 that provides an adjustable magnification continuously within a particular range (for example, 2×-4×).

In some implementations, as the third lens 402 translates, the first lens 304 can also translate a proportional distance to ensure that the focus of the afocal attachment 102 remains constant as the zoom is changed. This can be accomplished with, for example, a worm drive system that uses a cam and pin configuration to translate both the third lens 402 and the first lens 304 in a non-linear fashion as an outer ring is rotated.

In one example, the afocal attachment can provide a set magnification (such as, 2× or 3×) and provide turret adjustments for bore sighting the afocal attachment with a telescope (for example, a rifle scope).

In some implementations, the afocal attachment can optionally include a focus adjustment feature. For example, a mechanism (such as, a knob, a gear, or a pivot slot) can be provided to allow an operator to adjust the lens geometry of the afocal attachment in order to adjust the focus produced.

In another implementation, combinable with any described implementation, the afocal attachment can be configured to provide multiple magnification levels. For example, the afocal attachment may provide a 2× magnification, which can be switched to a 4× magnification. In another example, the afocal attachment can be configured to provide a continuously adjustable magnification level between two values. In this example, magnification may be adjusted by moving one or more of the lenses in the system, for example, translating an intermediate lens forward or backward.

In another implementation, combinable with any of the described implementations, the afocal attachment may feature refractive lenses or consecutive lenses, aligned in series. Alternatively, the lenses may be configured to be reflective (for example, a set of mirrors or partially mirrored surfaces) and may split received electromagnetic radiation through multiple paths, such as, a path that transmits light to the objective end of a telescope and a path that transmits light to an instrument (for example, a digital receiver, a night vision system, or a recording system, among other things). In some implementations, the instrument can be centered within the lenses or be placed in any position relative to the lenses.

Figure 5:
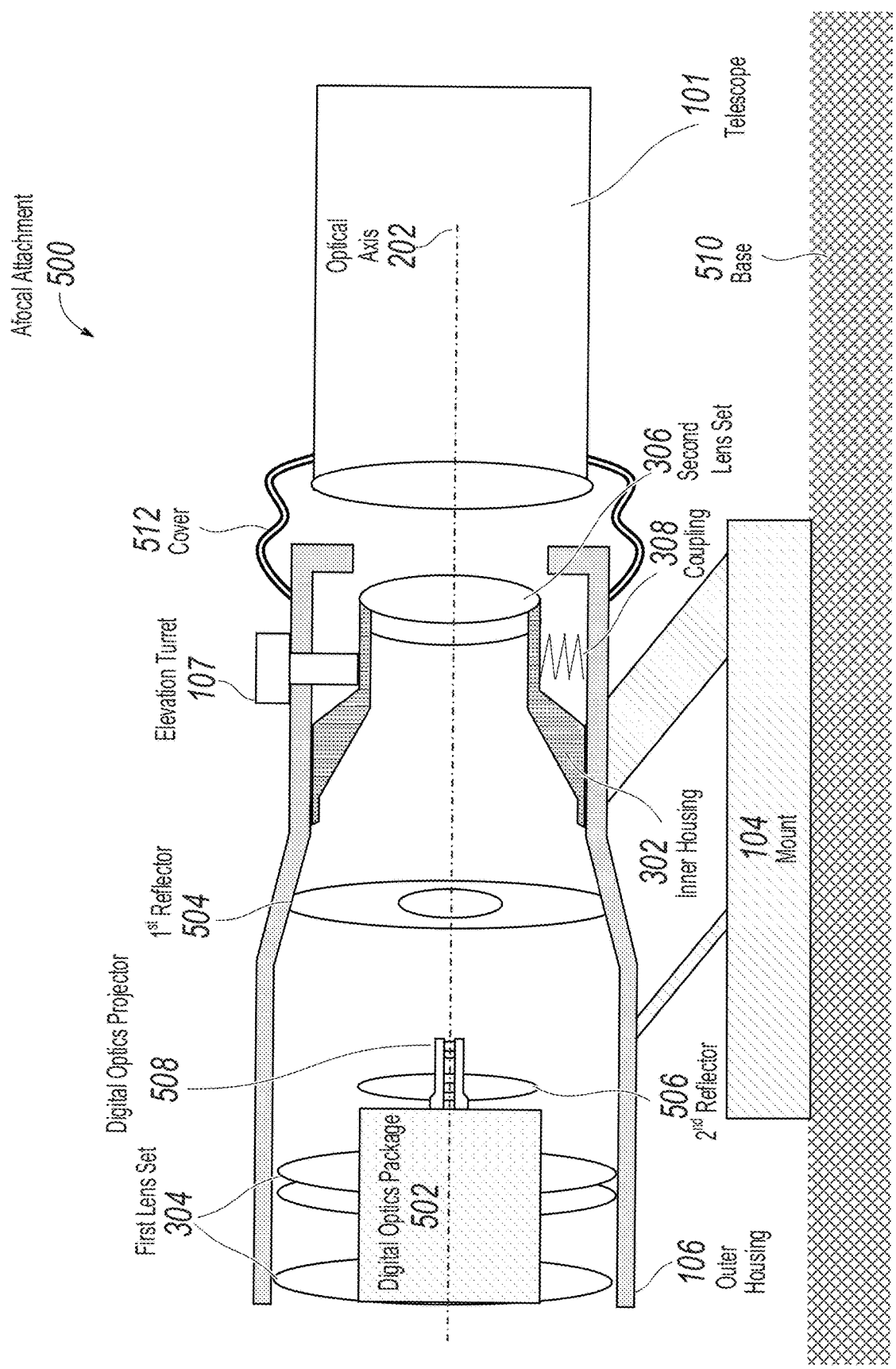
FIG. 5 is a cutaway diagram 500 of an example afocal attachment with a digital optics package installed, according to an implementation of the disclosure.

FIG. 5 is a cutaway diagram 500 of an example afocal attachment with a digital optics package installed, according to an implementation of the disclosure.

The afocal attachment 500 illustrated in FIG. 5 includes an outer housing 106, an elevation turret 107, an inner housing 302, and a coupling 308, as described previously. In this implementation, the first lens 304 and the second lens 306 are lens sets, including multiple lenses which can be separate or connected as a single component (e.g., with adhesive, or other bonding methods).

Afocal attachment 500 includes a mount 104 which can be similar to the mount 104 as described with respect to FIG. 1, or different. For example, as depicted in FIG. 5, mount 104 is positioned below the afocal attachment 500 and configured to mount to a common base 510. In this implementation, the base 510 can be a Picatinny rail, which can be shared between the mount 104 and the telescope 101. In some implementations, the mount 104 can be height adjustable, to allow alignment of the afocal attachment 500 with the telescope 101. In other implementations, the mount 104 can be custom designed to a predetermined height or other dimension. In implementations where the afocal attachment 500 does not affix directly to the objective end of the telescope 101, a cover 512 can be provided to prevent or limit light, dust, or other forms of contamination from entering the space between the afocal attachment 500 and the telescope 101. The cover 512 can be a rubber sleeve cover, an accordion type cover, gasket, or other suitable component.

Afocal attachment 500 includes a digital optics package 502. The digital optics package 502 can be a separate system, which receives electromagnetic radiation simultaneously with the first lens set 304. The digital optics package 502 can have an independent aperture positioned in the center of the first lens set 304. In some implementations, the digital optics package is located in a dead zone, or an area of the first lens set 304 which does not receive useful electromagnetic radiation. In some implementations, the digital optics package is external to the outer housing 106, and data from the digital optics package 502 is transmitted (e.g., via fiber optics, or wire) to the digital optics projector through the outer housing 106 (not illustrated).

In some implementations, the digital optics package 502 includes a night vision package. In these implementations, ambient light from the visible spectrum and near IR spectrum is collected at the aperture, passed through one or more photomultiplier tubes, and onto a phosphor screen located in the digital optics projector 508. In some implementations, the digital optics package 502 includes an IR package, which produces a thermal image representing received IR radiation. For example, the digital optics package 502 can include an array of microbolometers which produce a changing resistance based on changing incident IR radiation. These resistances can be measured and processed by a computing device, and the results can be produced on a display in the digital optics projector 508. In some implementations, the digital optics package 502 includes a laser rangefinder. In these implementations, the digital optics package can transmit a laser pulse and record a time delay between transmit time and a time a return is received from the laser reflecting off an object yielding a time of flight. The distance to the object can be calculated based on the measured time of flight and an estimated speed of laser light. This information can then be presented on a display in the digital optics projector 508. The digital optics package 502 can include a combination of the foregoing features or other digital processing of received electromagnetic radiation. In some implementations, the digital optics package 502 has two or more apertures and provides data to two or more displays. In some implementations, the digital optics package 502 includes a single aperture. The digital optics package 502 can include one or more power sources (e.g., battery, solar cell, etc.) which can be located internally to the digital optics package 502 and the outer housing 106, but external to the digital optics package 502, or external to the afocal attachment 500.

The digital optics projector 508 receives data from the digital optics package 502. The data can be either discrete information (e.g., serial data or digital data) or analog information (e.g., continuous voltages, or photons etc.) The digital optics projector 508 can have one or more displays which convert the received data to light in an image, which is then projected out the transmitting end of the afocal attachment 500. The digital optics projector 508 can include one or more lenses which can be separate from the optical channel or a part of the optical channel.

Electromagnetic radiation or light entering the afocal attachment 500 passes through the first lens set 304 where it is guided to the first reflector 504. The first reflector 504 redirects and focuses incident radiation back to a second reflector 506. Radiation leaving the second reflector 506 can be joined by radiation leaving the digital optics projector 508, pass through a hole or cutout in the first reflector 504, then through the second lens set 306 into the objective end of the telescope 101. This results in a user at the viewing end of the telescope 101 seeing a magnified image as compared to what would be viewed without the afocal attachment 500, the image including an overlay containing a digital image produced by the digital optics projector 508. This can yield, for example, a magnified image with a thermal image overlay, showing areas of high IR emission or "hotspots." In another example, a magnified image with a range numerically displayed as determined by a laser range finder can be viewed at the viewing end of the telescope 101.

The foregoing description is provided in the context of one or more particular implementations. Various modifications, alterations, and permutations of the disclosed implementations can be made without departing from scope of the disclosure. For example, although the foregoing afocal attachment 102 has been described in terms of attachment to the telescope 101 illustrated in FIG. 1, as will be appreciated by those skilled in the art, the afocal attachment can be adapted to attach to/be used with any other camera/optical system in a manner consistent with this disclosure. In addition, although the afocal attachment 102 has been illustrated in particular shapes, configurations, or orientations, as will be appreciated by those skilled in the art, the afocal attachment 102 can be configured to be any shape, configuration, or orientation consistent with this disclosure. Thus, the present disclosure is not intended to be limited only to the described or illustrated implementations, but is to be accorded the widest scope consistent with the principles and features disclosed herein.

What is claimed is:

1. An afocal attachment, comprising:
    an optical channel comprising a receiving end and a transmitting end, wherein the optical channel forms a first optical axis;

a first lens positioned at the receiving end of the optical channel;

a second lens positioned at the transmitting end of the optical channel;

an inner housing, comprising an inner surface defining a receptacle for the second lens, the inner housing enclosing a portion of the optical channel;

an outer housing coupled to the inner housing and at least partially enclosing the inner housing, wherein the inner housing and the outer housing are movably coupled such that the first optical axis is adjustable;

a mounting connection for affixing the afocal attachment in a position in front of an objective lens of an optical instrument, the optical instrument having a second optical axis, wherein the position is such that the first optical axis can be aligned with the second optical axis;

at least one adjustment mechanism in contact with the inner housing and configured to allow for precision adjustment of an alignment of the first optical axis; and a digital optics package positioned in a central dead zone of the first lens comprising:
an aperture for receiving electromagnetic radiation;
a processing device to transform electromagnetic radiation received at the aperture into data; and
a digital optics projector configured to project an overlay image generated based on the data through the second lens, wherein the overlay image is presented in addition to an optical image provided via the optical channel.

2. The afocal attachment of claim 1, wherein the mounting connection is a friction mount comprising:
a retention band; and
a tightening screw.

3. The afocal attachment of claim 1, wherein the mounting connection is on the outer housing and is a thread and screw type connection, wherein the afocal attachment is threaded directly onto the optical instrument.

4. The afocal attachment of claim 1, wherein the mounting connection is a bayonet mount.

5. The afocal attachment of claim 1, wherein the mounting connection comprises:
a mounting block attached to the outer housing and configured to be mounted to a Picatinny rail, wherein a height of the afocal attachment above the Picatinny rail is adjustable, and wherein the optical instrument is mounted to the Picatinny rail.

6. The afocal attachment of claim 1, wherein a magnification produced by the afocal attachment is adjustable.

7. The afocal attachment of claim 6, comprising:
a third lens supported by an intermediated housing, wherein the third lens receives electromagnetic radiation that has transited the first lens, prior to the electromagnetic radiation transiting the second lens, wherein the third lens is configured to be translated along the first optical axis, and wherein translation of the third lens causes adjustment of the magnification.

8. The afocal attachment of claim 1, comprising:
a primary reflector configured to receive electromagnetic radiation that has transited the first lens prior to the electromagnetic radiation transiting the second lens; and
a secondary reflector configured to receive electromagnetic radiation that has been reflected by the primary reflector.

9. The afocal attachment of claim 1, wherein the digital optics package comprises at least one of:
a night vision optical system;
an infrared optical system; or
a laser rangefinder.

10. A method for changing optical parameters of a telescope, the method comprising:
mounting an afocal attachment in front of an objective end of the telescope, the afocal attachment comprising:
an optical channel comprising a receiving end and a transmitting end, wherein the optical channel forms a first optical axis;
a first lens positioned at the receiving end of the optical channel;
a second lens positioned at the transmitting end of the optical channel;
an inner housing, comprising an inner surface defining a receptacle for the second lens, the inner housing enclosing a portion of the optical channel;
an outer housing configured to affixed to the inner housing and at least partially enclosing the inner housing, wherein the inner housing and the outer housing are movably coupled such that the first optical axis is adjustable;
a mounting connection for affixing the afocal attachment in a position in front of an objective lens of the telescope, the telescope having a second optical axis, wherein the position is such that the first optical axis can be aligned with the second optical axis;
at least one adjustment mechanism in contact with the inner housing and configured to allow for precision adjustment of an alignment of the first optical axis; and
a digital optics package positioned in a central dead zone of the first lens comprising:
an aperture for receiving electromagnetic radiation;
a processing device to transform electromagnetic radiation received at the aperture into data; and
a digital optics projector configured to project an overlay image generated based on the data through the second lens, wherein the overlay image is presented in addition to an optical image provided via the optical channel;
adjusting, using the adjustment mechanism, the first optical axis to align it with the second optical axis; and
observing electromagnetic radiation at a transmitting end of the telescope that has been altered by the afocal attachment and the telescope.

11. The method of claim 10, wherein a magnification produced by the afocal attachment is adjustable.

12. The method of claim 11, the afocal attachment further comprising:
a third lens supported by an intermediated housing, wherein the third lens receives electromagnetic radiation that has transited the first lens, prior to the electromagnetic radiation transiting the second lens, wherein the third lens is configured to be translated along the first optical axis, and wherein translation of the third lens causes adjustment of the magnification.

13. The method of claim 10, the afocal attachment further comprising:
a primary reflector configured to receive electromagnetic radiation that has transited the first lens prior to the electromagnetic radiation transiting the second lens; and
a secondary reflector configured to receive electromagnetic radiation that has been reflected by the primary reflector.

14. A system for changing optical parameters of a telescope comprising:

an optical channel comprising a receiving end and a transmitting end, wherein the optical channel forms a first optical axis;

a first lens positioned at the receiving end of the optical channel;

a second lens positioned at the transmitting end of the optical channel;

an inner housing, comprising an inner surface defining a receptacle for the second lens, the inner housing enclosing a portion of the optical channel;

an outer housing configured to affixed to the inner housing and at least partially enclosing the inner housing, wherein the inner housing and the outer housing are movably coupled such that the first optical axis is adjustable;

a mounting connection for affixing an afocal attachment in a position in front of an objective lens of an optical instrument, the optical instrument having a second optical axis, wherein the position is such that the first optical axis can be aligned with the second optical axis;

at least one adjustment mechanism in contact with the inner housing and configured to allow for precision adjustment of an alignment of the first optical axis; and a digital optics package positioned in a central dead zone of the first lens comprising:
  an aperture for receiving electromagnetic radiation;
  a processing device to transform electromagnetic radiation received at the aperture into data; and
  a digital optics projector configured to project an overlay image generated based on the data through the second lens, wherein the overlay image is presented in addition to an optical image provided via the optical channel.

15. The system of claim 14, wherein a magnification produced by the afocal attachment is adjustable.

16. The system of claim 15, comprising:
a third lens supported by an intermediated housing, wherein the third lens receives electromagnetic radiation that has transited the first lens, prior to the electromagnetic radiation transiting the second lens, wherein the third lens is configured to be translated along the first optical axis, and wherein translation of the third lens causes adjustment of the magnification.

17. The system of claim 14, comprising:
a primary reflector configured to receive electromagnetic radiation that has transited the first lens prior to the electromagnetic radiation transiting the second lens; and
a secondary reflector configured to receive electromagnetic radiation that has been reflected by the primary reflector.

18. The system of claim 14, wherein the digital optics package comprises at least one of:
a night vision optical system;
an infrared optical system; or
a laser rangefinder.

* * * * *